Patented Oct. 10, 1939

2,175,257

UNITED STATES PATENT OFFICE 2,175,257

MANUFACTURE OF CELLULOSE

Henry Dreyfus, London, England

No Drawing. Application June 23, 1936, Serial No. 86,820. In Great Britain July 11, 1935

8 Claims. (Cl. 92—13)

This invention relates to the manufacture from lignin-containing cellulosic materials, such for example as wood, straw, grass, and partially delignified materials such as unbleached wood pulps, of cellulose which is suitable for use as a starting material in the manufacture of organic derivatives of cellulose.

It is well known that the pulps normally produced by pulping processes, such as the sulphite and soda processes, are not suitable for use in the manufacture of high quality cellulose derivatives even after bleaching; the main reason for this appears to be that the pulps have an undesirably low α-cellulose content for the purpose in view. This is believed to be due, at least mainly, to incomplete removal of lignin, pentosans, or other non-cellulosic constituents of the original wood, or to degradation of the cellulose during the pulping treatment, or to both these causes. Generally speaking the farther the purification or pulping process is carried, the more the cellulose is degraded, so that it is not possible to obtain a suitably pure cellulose simply by carrying out the pulping operation for a longer period than usual.

I have now found that a cellulose of a high degree of purity and high α-cellulose content may be produced by treating lignin-containing cellulosic materials with relatively dilute alkali solutions, and raising the temperature, either continuously or in stages, as the treatment proceeds.

It is preferable to employ as the alkali solution a caustic soda solution of concentration below about 10%, or its equivalent. For example a caustic soda solution of concentration about 2½% to 8%, and especially 5% to 7½%, may be used with advantage. The amount of solution is preferably such that the amount of caustic soda contained therein exceeds 25% of the weight of wood being treated; for example it may be between 30% and 50% of the weight of wood. When the treatment is being applied to materials containing relatively small amounts of lignin, for example unbleached wood pulps, smaller quantities and/or lower concentrations of caustic soda may be used than when treating wood or other natural lignocellulosic materials. If desired fresh alkali may in the later stage or stages either be added to or replace the alkali used in the earlier stage or stages of the treatment.

The temperature limits within which the treatment is carried out may be about 120° and 180° C.; for instance good results may be obtained using temperatures between about 135° and 170° C., and especially between 140° or 145° and 165° C. The treatment may be effected under the pressure produced by the alkali solution at the temperature employed or under a higher pressure; pressures in excess of the vapour pressure of the alkali solution may be produced by means of compressed nitrogen or other gas or vapour which does not chemically affect the reaction; or by the addition of relatively small quantities of a volatile organic liquid, or in any other suitable way.

It is usually preferable that the increase of temperature during the reaction, whether it be continuous or discontinuous, may be effected at a more or less regular rate. For example the temperature may be raised at a rate of about 3–7° C., and especially about 5° C., every hour of the treatment. Thus for example if the treatment lasts for about 5 hours the temperature at the beginning of the treatment may be about 130° or 140° C. and at the end 155° or 165° C. The invention is, however, in no way limited to these figures, since other temperatures, rates of temperature increase and/or times of treatment may very well be employed, depending largely on the amount and concentration of the alkali solution and the nature and physical state of the material undergoing delignification. For example, a very satisfactory product may be obtained by subjecting the material to a treatment in two stages, the first at a relatively low temperature, e. g. 135–145° C., and the second at a considerably higher temperature, e. g., 155–165° C. Each treatment may for example be continued for between 1 and 3 hours. Moreover the temperature may if desired be caused to rise continuously or in steps during each stage of the treatment.

Especially when the product is to be used in the manufacture of cellulose esters and ethers, the treatment is preferably carried on until the cellulose produced has a low residual lignin content, a low pentosan content, and a high α-cellulose content. The time necessary to achieve this result will depend on the temperatures, concentrations of alkali and bulk of liquor employed. Products which are satisfactory in these respects may be obtained by carrying out the treatment under a relatively wide range of conditions, a change in one condition often being compensated for by a corresponding change in another. By way of example, if the average or mean temperature of the treatment is increased, then the time occupied by the treatment may be decreased; similarly an increase in the amount of liquor employed may to a certain extent compensate for a decrease in the time of treatment or in the concentration of alkali in the liquor.

If desired the caustic alkali may be replaced partly or, much less advantageously, wholly by another alkali such as for example sodium sulphide, or such other alkali, or other chemical such for instance as sodium sulphite or sodium chloride or other salt, may be employed as well as the full amount of caustic soda. For instance a solution comprising 6 or 7% of caustic soda and 2, 4 or 6% of sodium sulphide, or similar or even higher proportions of sodium sulphite, may be used. Moreover, different alkalis may be used at different stages in the treatment; for example in the first and lower temperature stage caustic soda may be used, and in the later and higher temperature stage sodium sulphide. For instance, cellulosic material may be treated first with a 6-9% caustic soda solution at about 135°-140° C. and then with a sodium sulphide solution of similar concentration at 150-165° C. The temperature during each stage may be constant or may rise continuously or in steps.

The product obtained from the alkali treatment may if desired be subjected to further treatments designed to purify it to a still higher degree, preferably without substantial attack of the cellulose. For example a further decrease in the pentosan content may be obtained by a treatment with a somewhat more concentrated alkali solution in the cold; such a treatment may be effected by means of a 10-20% caustic soda solution, for instance a solution of concentration between 12 and 15%. Moreover the product may if desired be subjected to a bleaching operation, for instance with chlorine water or bleaching powder or sodium hypochlorite. Other after-treatments, for example a boil with a dilute alkali solution, may be employed if desired.

The cellulose produced by the process of the invention, while of particular value as a starting material in the manufacture of cellulose esters and ethers, may also be employed for any of the purposes for which cellulose is used. For example it may be used in the manufacture of paper, and especially of the better grades of paper. It may also serve as a raw material in the manufacture of regenerated cellulose artificial silk, foils and other products, for example by the viscose or cuprammonium process.

When the cellulose is to be converted into a cellulose ester such as cellulose acetate, it is preferably first subjected to a pretreatment with an acid, especially with a lower fatty acid such as formic acid or acetic acid. Such acids may be applied in small or large quantities and in liquid or vapour form. Similarly, pretreatments with mineral acids, for example hydrochloric acid or sulphuric acid, may be applied, preferably in conjunction with acetic acid or other lower fatty acids; such pretreatments are preferably carried out under conditions of temperature, concentration and quantity of mineral acid, which do not lead to substantial degradation of the cellulose. A pretreatment with a lower fatty acid, for example acetic acid, may be applied in such a way as to introduce into the cellulose the catalyst required for the subsequent acetylation or other esterification. If desired, any mineral acid used during the pretreatment may be neutralised or substantially neutralised before applying the esterifying agent. For further details as to the pretreatments reference is made to my French Specification No. 565,654, and my U. S. Patents Nos. 1,831,101 and 1,911,069.

For the manufacture of good quality cellulose ethers and for the manufacture of viscose and other cellulose derivatives in which alkali is present during the conversion to the cellulose derivative, pretreatments with mineral and/or organic acids are in general unnecessary and the cellulose may be subjected directly to the treatment for conversion into the desired cellulose derivative. Similarly, in making nitrocellulose the nitrating acid may be applied directly to the purified cellulose prepared in accordance with the present invention.

Derivatives of cellulose made from cellulose produced according to the invention may be employed in the manufacture of artificial filaments, yarns, films, foils and other articles, and of lacquers, veneers, moulding powders and other compositions.

The following examples illustrate without in any way limiting the invention:

Example 1

Poplar or spruce chips are cooked with 6 times their weight of 7½% caustic soda solution at the following temperatures:

|  | °C. |
|---|---|
| For 2 hours at | 130–140 |
| For 2 hours at | 140–150 |
| For 1 hour at | 150–160 |
| For 1 hour at | 160–165 |

A good yield of cellulose of low pentosan and high α-cellulose content is obtained.

Example 2

Poplar or spruce chips are cooked with 6 times their weight of 7½% caustic soda solution at the following temperatures:

|  | °C. |
|---|---|
| For 2 hours at | 140–150 |
| For 2 hours at | 150–160 |
| For 2 hours at | 160–165 |

The product obtained is similar to that resulting from the process described in Example 1.

Example 3

Poplar or spruce chips are cooked first with 6 times their weight of a 7½% caustic soda solution at a temperature of 135°-140° C. for 2 hours, and then with 6 times their weight of a 7½% sodium sulphide solution either for 4 hours at 145°-150° C. or for 3 hours at 155°-160° C. If desired the sodium sulphide may be replaced by sodium sulphite.

Having described my invention what I desire to secure by Letters Patent is:

1. Process for the manufacture of cellulose, which comprises subjecting lignin-containing cellulosic materials to the action of an alkaline solution of alkalinity equivalent to that of a caustic soda solution of concentration between 2½ and 10% at a temperature which is initially at least 120° C. and which rises as the treatment proceeds by between 3° and 7° C. every hour to a value between 155° and 180° C.

2. Process for the manufacture of cellulose, which comprises subjecting chemical wood pulps to the action of an alkaline solution of alkalinity equivalent to that of a caustic soda solution of concentration between 2½ and 10% at a temperature which is initially at least 120° C. and which rises as the treatment proceeds by between 3° and 7° C. every hour to a value between 155° and 180° C.

3. Process for the manufacture of cellulose, which comprises subjecting lignin-containing cellulosic materials to the action of an alkaline solution of alkalinity equivalent to that of a caustic soda solution of concentration between 2½ and 10% at a temperature which is initially at least 120° C. and which rises as the treatment proceeds by between 3° and 7° C. every hour to a value between 155° and 180° C., the material being in contact with the alkaline solution at all times during the treatment.

4. Process for the manufacture of cellulose, which comprises subjecting chemical wood pulps to the action of an alkaline solution of alkalinity equivalent to that of a caustic soda solution of concentration between 2½ and 10% at a temperature which is initially at least 120° C. and which rises as the treatment proceeds by between 3° and 7° C. every hour to a value between 155° and 180° C., the material being in contact with the alkaline solution at all times during the treatment.

5. Process for the manufacture of cellulose, which comprises subjecting chemical wood pulps to the action of a caustic soda solution of concentration between 2½ and 10% at a temperature which at the beginning of the treatment is between 120° and 145° C., and which rises as the treatment proceeds by between 3° and 7° C., every hour to a value between 155° and 180° C.

6. Process for the manufacture of cellulose, which comprises subjecting chemical wood pulps to the action of a caustic soda solution of concentration between 2½ and 8% at a temperature which at the beginning of the treatment is between 140° and 145° C. and which rises as the treatment proceeds by between 3° and 7° C. every hour to 165° C., the material being in contact with the alkaline solution at all times during the treatment.

7. Process for the manufacture of cellulose, which comprises subjecting chemical wood pulps to the action of a caustic soda solution of concentration between 5 and 7½% at a temperature which at the beginning of the treatment is between 120° and 145° C., and which rises during the treatment at an average rate of between 3° and 7° C. per hour to a value between 155° and 180° C.

8. Process for the manufacture of cellulose, which comprises subjecting chemical wood pulps to the action of a caustic soda solution of concentration between 5 and 7½% at a temperature which at the beginning of the treatment is between 140° and 145° C. and which rises during the treatment at an average rate of between 3° and 7° C. per hour to 165° C., the material being in contact with the alkaline solution at all times during the treatment.

HENRY DREYFUS.